March 23, 1971  F. I. BARATTA  3,572,102
FIXTURE FOR TESTING BRITTLE MATERIALS
Filed May 12, 1969
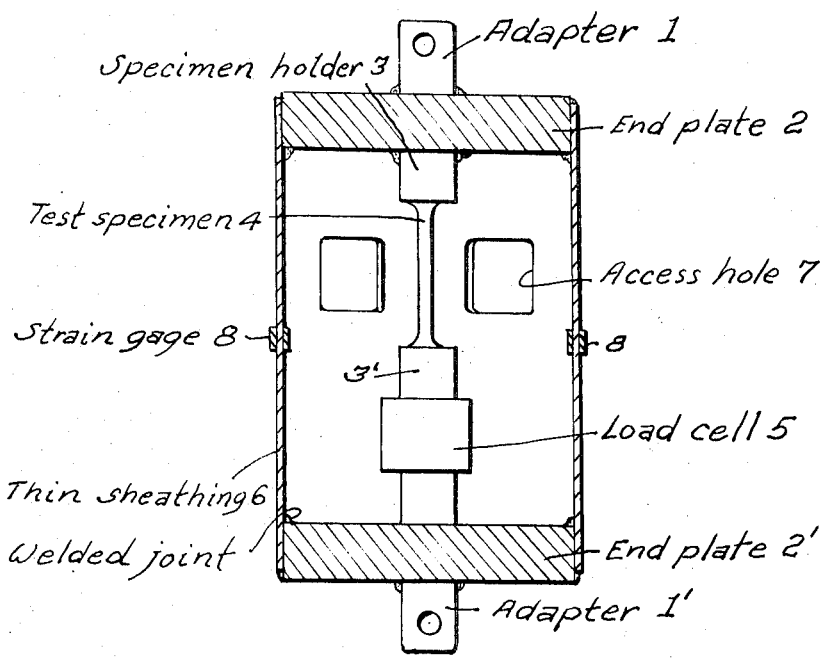
INVENTOR,
Francis I. Baratta
BY: Harry M. Saragovitz
Edward J. Kelly, Herbert Berl &
Robert P. Gibson      ATTORNEYS.

United States Patent Office 3,572,102
Patented Mar. 23, 1971

3,572,102
FIXTURE FOR TESTING BRITTLE MATERIALS
Francis I. Baratta, 138 Ridge St.,
Arlington, Mass. 02174
Filed May 12, 1969, Ser. No. 823,879
Int. Cl. G01n 3/00
U.S. Cl. 73—93                                             4 Claims

ABSTRACT OF THE DISCLOSURE

Brittle materials to be tested are formed into small test specimens. These specimens are then subjected to a compression force, or a tension force, until they rupture. The rupture or yield point is then recorded. If the compression or tension forces are slightly misaligned, bending or twisting of the specimen will cause premature rupture and inaccurate data as to the true strength of the material. This invention teaches simple apparatus, a yieldable thin cylinder around the specimen, to reduce such bending or twisting of the specimen.

---

The invention described herein may be manufactured, used and licensed by or for the Government for governmental purposes without the payment to me of any royalty thereon.

In order to test brittle materials for strength in pure compression, or pure tension, it is necessary to prevent the introduction of bending forces, or twisting forces, because such forces tend to snap the test specimen and provide a premature rupture. Various apparatus and methods have been devised to help alleviate this problem. One example is a cylinder with the test specimen connected between two pistons. Fluid pressure may be supplied between the pistons to the inner faces, to exert outward forces on the specimen and place it under tension to the point of rupture. Or, fluid pressure may be supplied to the outer faces of the piston to push inwardly on the pistons and thereby place the specimen under compression.

Other apparatus and methods of testing have been devised. However, each has drawbacks and limitations. The fluid cylinder-pistons arrangement requires an external source of fluid pressure, and requires disassembly of the cylinder-pistons to remove the specimen previously tested and to insert a new specimen. Another approach to the problem is to minimize bending or twisting forces by using gas-loaded ball and socket bearings in the force train which introduce compression or tension forces to the test specimen. However, this requires a source of gas pressure and high-precision expensive bearings. Another approach is by use of extremely high-precision bearings and load-train alignment of parts and specimen, a very expensive approach.

To illustrate the importance of the present invention let us consider a round specimen of ⅜ inch diameter, to be tested under tension. Assume a fair-quality testing machine wherein the ends of the testing machine to which the specimen is to be attached has an eccentricity of only 0.005 inch. The test specimen is brittle and the error due to the slight eccentricity is 10.7%, computed as a constant (eight) times the ratio of the bending stress $e$ divided by the axial stress $d$, i.e., $8e/d$. By using the present invention, with a bending moment absorption fixture, having a sheathing diameter of six inches and a wall thickness of 0.05 inch, the error is only 0.06%, an error reduction of about 180 times.

In the drawing:
The single figure illustrate the invention.
Adapters 1, 1′, attached to end plates 2, 2′, may be attached to the testing machine which pulls on adapters 1, 1′ for tension testing or pushes on these adapters for compression testing. Specimen holders 3, 3′ are attached to end plates 2, 2′ and to test specimen 4. A load cell 5 may be used, connected to known electrical apparatus, to indicate the degree of compression or tension applied to specimen 4 and cell 5. A thin sheathing shell 6 is attached to end plates 2, 2′ and surrounds specimen 4. Shell 6 is preferably round and cylindrical but could have square side walls, or other shapes. An access hole (or holes) 7 is provided to permit insertion and removal of test specimen 4. A strain gage 8, or several strain gages around the periphery of shell 6, may be attached to shell 6 and connected to electrical apparatus to indicate the degree of compression or tension applied to shell 6 and specimen 4 through adapters 1, 1′.

Shell 6 is thin and therefore can be slightly stretched under tension or compressed under compression thereby permitting much of the force to be applied to brittle specimen 4 until it ruptures.

For some purposes either load cell 5, or strain gages 8 could be dispensed with. Either will give an indication of the degree of force exerted against adapters 1, 1′. However, strain gages 8 could be used to perform an additional function. If there is a slight misalignment of parts then the tension, or compression, on one side of the shell 6 will be slightly greater than on the other. The electrical indicator, connected to two or more of such gages at spaced points on the periphery of shell 6, would register differently, thereby indicating the misalignment.

I claim:
1. A fixture for testing materials comprising a thin shell member, force-transmitting means attached to the ends of said shell member and adapted to receive compression or tension forces, or both, from a testing machine, holder means adjacent to the center of said shell member to hold a specimen to be tested, said thin shell member being yieldable yet lending support to minimize bending or twisting of a specimen under test and means to indicate the degree of force applied to said thin shell.
2. A fixture as in claim 1 wherein said last-mentioned means also indicates the misalignment of forces applied through said force-transmitting means.
3. A fixture as in claim 2 and further means to indicate the degree of force applied to the specimen.
4. A fixture as in claim 3 and access hole means in said thin shell to permit insertion or removal of the specimen.

References Cited

UNITED STATES PATENTS

| | | | |
|---|---|---|---|
| 2,699,060 | 1/1955 | Safford | 73—15.4 |
| 3,433,061 | 3/1969 | Burr | 73—95 |
| 3,439,532 | 4/1969 | Grumbach | 73—89 |
| 3,440,869 | 4/1969 | Hardiman | 73—89 |

FOREIGN PATENTS

| | | | |
|---|---|---|---|
| 540,877 | 12/1931 | Germany | 42K—20 |

OTHER REFERENCES

M.T.S. Div., Research, Inc., Alignomatic Grips, Feb. 2, 1965.
Weiner Gripping Device to Test Brittle Metal, Review of Sci. Inst., p. 1081, vol. 27, No. 12, December 1956.

RICHARD C. QUEISSER, Primary Examiner
J. J. WHALEN, Assistant Examiner

U.S. Cl. X.R.
73—103